United States Patent [11] 3,619,121

| [72] | Inventors | Gunther Boehmke<br>Leverkusen, Grobendriesch;<br>Walter Hees, Koeln, Hoechenberg, both of<br>Germany |
|---|---|---|
| [21] | Appl. No. | 865,161 |
| [22] | Filed | Oct. 9, 1969 |
| [45] | Patented | Nov. 9, 1971 |
| [73] | Assignee | Farbenfabriken Bayer Aktiengesellschaft<br>Leverkusen, Germany |
| [32] | Priority | Aug. 7, 1969 |
| [33] | | Germany |
| [31] | | P 19 40 179.7 |

[54] POLYACRYLONITRILE DYEING WITH N-ALKYLAMINOALKYLSULFONIC ACIDS AND BASIC DYES
3 Claims, No Drawings

[52] U.S. Cl. .................................................. 8/169, 8/172, 8/177 AB
[51] Int. Cl. ....................................................... D06p 5/04

[50] Field of Search ........................................... 8/177 AB, 169

[56] References Cited
UNITED STATES PATENTS

| 2,123,740 | 7/1938 | Murphy | 8/84 X |
| 2,255,082 | 9/1941 | Orthner | 8/84 X |
| 3,133,039 | 5/1964 | Davis | 8/172 X |
| 3,478,001 | 11/1969 | Szota | 8/173 X |

Primary Examiner—Donald Levy
Attorney—Plumley and Tyner

ABSTRACT: Polyacrylonitrile fibers are dyed with a basic dye in a solution of a long chain alkylaminoalkanesulfonate or long chain alkyl-, hydroxyalkyl-aminoalkanesulfonate and a nonionc emulsifier. N-Octadecenyl-, N, N - dihydroxyethylaminoethane sulfonate or N-Octyldecyl-, N-benyl-, N-Hydroxylethyl ethanesulfonate are used with a basic azo, oxazine or anthraquionone dye.

POLYACRYLONITRILE DYEING WITH N-ALKYLAMINOALKYLSULFONIC ACIDS AND BASIC DYES

The present invention relates to a process for dyeing fiber materials made of polyacrylonitrile or copolymers containing acrylonitrile with cationic dyestuffs; more particularly it concerns a process wherein the dyeing is carried out in the presence of N-alkylaminoalkanesulphonic acids of formula

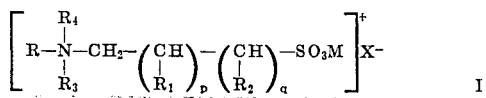

$$\left[ R-\underset{\underset{R_3}{|}}{\overset{\overset{R_4}{|}}{N}}-CH_2-\left(\underset{\underset{R_1}{|}}{CH}\right)_p-\left(\underset{\underset{R_2}{|}}{CH}\right)_q-SO_3M \right]^+ X^- \qquad I$$

wherein $R_1$ and $R_2$ independently of one another denote hydrogen or a hydroxyl group, the sum $p+q$ is a number from 1–3, M denotes hydrogen, an alkali or alkaline earth metal ion or an ammonium group, R represents a $C_{10}$–$C_{22}$-alkyl or $C_{10}$–$C_{22}$-alkenyl radical, $R_3$ and $R_4$ independently of one another represent a $C_1$–$C_8$-alkyl group which is optionally substituted by a hydroxyl or carbonamide group, or represent a benzyl residue, and $x^1$ denotes an anion.

For R, the dodecyl, tetradecyl, hexadecyl, octadecyl and docosyl radicals may for example be mentioned as $C_{10}$–$C_{22}$-alkyl radicals and the decenyl, tetradecenyl, hexadecenyl and octadecenyl radicals as $C_{10}$–$C_{22}$-alkenyl radicals.

For $R_3$ and $R_4$, the following may for example be mentioned as $C_1$–$C_8$-alkyl radicals which are optionally substituted by a hydroxyl or carbonamide group: the methyl, ethyl, n-propyl, i-propyl, sec.-butyl, n-hexyl and 2-ethylhexyl radical, and the 2-hydroxyethyl, 1-hydroxypropyl-(2) and carbonamidomethyl radical.

For M, are mentioned as alkali metal ions especially the sodium and potassium ion, as alkaline earth metal ions especially the magnesium and calcium ion, and as ammonium groups especially the ammonium group itself and the ammonium groups derived from monoethanolamine, diethanolamine and triethanolamine.

Suitable anions $x^1$ are especially the halide ions, such as the chloride, bromide, and iodide ion, the anions of acid alkyl-sulphate esters, such as the methylsulphate and ethyl-sulphate ion, and the toluenesulphonate ion.

As representatives of the N-alkylaminoalkanesulphonic acids to be used in accordance with the invention, there may be mentioned the compounds of formula I in which R, $R_1$, $R_2$, $R_3$, $R_4$, $p$, $q$, M and X have the following significance:

of color of the dyeing and on the affinity of the cationic dyestuff.

Possible cationic dyestuffs are dyestuffs of the most diverse classes of compounds, for example diphenylmethane, triphenylmethane and rhodamine dyestuffs, azo and anthraquinone dyestuffs containing onium groups, and thiazine, oxazine, methine and azomethine dyestuffs, such as are for example described in "American Dyestuff Reporter" (1954), pgs. 432–433.

The polyacrylonitrile fiber materials are the known polyacrylonitriles possessing anionic groups such as carboxyl, sulfonic acid, sulphimide and/or phosphonic acid groups.

Suitable copolymers containing acrylonitrile are for example those with vinyl chloride, vinylidene chloride, vinyl acetate, vinyl chloracetate, vinyl alcohol, acrylic and methacrylic acid, acrylic and methacrylic acid esters or allyl chloracetate, provided the proportion of these comonomers does not exceed 20 percent by weight.

The dyeing of the polyacrylonitrile fiber materials can be carried out in the usual manner, by introducing the goods to be dyed into an aqueous liquor warmed to about 50°–60° C. which contains the cationic dyestuff, the N-alkylaminoalkanesulphonic acids of formula I, additions of salts such as sodium acetate or sodium sulfate, and acids such as acetic acid or formic acid, subsequently increasing the temperature of the dyebath over the course of about 30–60 minutes to approximately 100° C. and then keeping the dyebath at this temperature until it is exhausted. It is however also possible only to add the cationic dyestuff subsequently to the dyebath, that is to say when the temperature of the bath has risen to 60°–100° C. Further, it is also possible to pretreat the goods to be dyed at a temperature of 40°–100° C. with a liquor which contains the usual salts and acids as well as the N-alkylaminoalkanesulfonic acids of formula I but does not yet contain a dyestuff, and only then to add the dyestuff and carry out the dyeing at 100° C. The possibility of adding the dyestuffs at an elevated temperature for example permits shading of dyeings without cooling and reheating the dyebath.

With the aid of the process according to the invention it is possible to dye fiber materials of the most diverse nature consisting of polyacrylonitrile or copolymers containing acrylonitrile, or containing such polymers or copolymers, for example spinning tows, combed tops, flocks, filaments, yarns, woven fabrics or knitted fabrics, outstandingly uniformly and

| R | $R_1$ | $R_2$ | p | q | $R_3$ | $R_4$ | M | X |
|---|---|---|---|---|---|---|---|---|
| $C_{18}H_{35}$ | H | | 1 | 0 | $-CH_2-CH_2-OH$ | $-CH_2-CH_2-OH$ | Na | Cl |
| $C_{18}H_{37}$ | H | | 1 | 0 | do | $-CH_2-C_6H_5$ | Na | Cl |
| $C_{12}H_{25}$ | H | H | 1 | 1 | do | $-CH_2-CH_2-OH$ | Na | Cl |
| $C_{12}H_{25}$ | OH | H | 1 | 1 | $-CH_3$ | $-CH_3$ | K | Cl |
| $C_{18}H_{35}$ | H | H | 1 | 2 | $-CH_2-CH_2-OH$ | $-CH_2-CH_2-OH$ | Na | Cl |
| $C_{18}H_{35}$ | H | | 1 | 0 | do | $-CH_3$ | Na | $CH_3O-SO_3$ |
| $C_{12-14}H_{25-33}$ | H | | 1 | 0 | do | $-CH_2-CH_2-OH$ | $NH(CH_2-CH_2-OH)_3$ | Cl |
| $C_{18}H_{35}$ | H | | 1 | 0 | do | $-CH_2-CONH_2$ | Mg | Cl |

The compounds to be used according to the invention can be manufactured by addition of propanesultone or butanesultone to tertiary amines, for example alkyldimethylamine, by reaction of tertiary amines with epichlorhydrin and sodium bisulphite, or by quaternication of tertiary alkylaminoalkanesulphonic acids with the usual quaternizing agents, for example dimethylsulphate or benzyl chloride.

The manufacture by reaction of fatty amines with the sodium salt of hydroxyethanesulphonic acid at 220°–250° C. and subsequent alkylation and quaternization of the resulting alkylaminoethanesulphonic acid succeeds particularly simply. Herein, ethylene oxide can be particularly advantageously used for the alkylation and quaternization of the aqueous solution of the alkylaminoethanesulphonic acid sodium salts. The alkyldihydroxyethyl-aminoethanesulphonic acid sodium salt results.

The requisite quantities of the compounds of formula I to be used according to the invention can vary within wide limits; they can be easily established by preliminary experiments. In general, 2–4 percent by weight, relative to the goods to be dyed, have proved successful, depending on the desired depth in deep shades.

The N-aminoalkanesulfonic acids to be used according to the invention are especially distinguished by their outstanding levelling effect when dyeing materials of polyacrylo-nitrile-bicomponent fibers. On this type of fibers, which is particularly difficult to dye uniformly, dyeings of excellent uniformity are achieved with the aid of the compounds to be used according to the invention, even when dyeing with mixtures of cationic dyestuffs of differing basicity. It should be emphasized that in spite of the differing speeds of absorption and degrees of absorption of the dyestuffs, very good exhaustion of the bath is achieved, and that the bulk volume of the bicomponent fibers is not impaired by dyeing.

The constitutions of the dyestuffs described with the numbers I–V in the examples which follow are given in the table to be found at the end of the examples.

EXAMPLE 1

Polyacrylonitrile fiber yarn is introduced, in a ratio of C. to liquor of 1:40, into a bath warmed to 50° C. which per litre contains red 0.04 g. of the dyestuff I, 2.5 g. of sodium sulfate, 0.25 g. of sodium acetate, 0.3 g. of glacial acetic acid, 0.125 g. of the addition product of 1 mol of oleyl alcohol and 50 mols of ethylene oxide and 0.5 g. of the compound

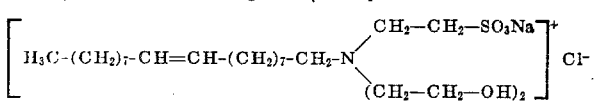

The bath is heated to 98° C. over the course of 45 minutes and is kept at this temperature for 60 minutes. A light bluishtinged red dyeing of excellent evenness is obtained.

EXAMPLE 2

Yarn of a polyacrylonitrile-bicomponent fiber (side-by-side bifilar type, 1st. component: polyacrylonitrile containing carboxyl groups, 2nd. component: polyacrylonitrile containing sulfonic acid groups) is introduced in a ratio of goods to liquor of 1:50 into a bath, warmed to 50° C., which per litre contains 0.072 g. of the dyestuff II, 0.07 g. of the dyestuff III, 0.21 g. of the dyestuff IV, 0.1 g. of the dyestuff V, 0.2 g. of sodium acetate, 2 g. of sodium sulfate, 0.3 g. of glacial acetic acid, 0.2 g. of the addition product of 1 mol of oleyl alcohol and 50 mols of the ethylene oxide and 0.4 g. of the compound

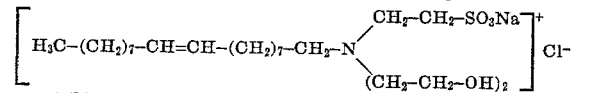

The bath is heated to 98° C. over the course of 90 minutes and is kept for 60 minutes at this temperature. A yarn of unchanged bulk volume, dyes in outstanding uniformity in a medium grey shade, is obtained.

EXAMPLE 3

A knitted fabric of the bicomponent polyacrylonitrile fiber mentioned in example 2 is introduced in a ratio of goods to liquor of 1:60 into a bath, warmed to 60° C., which per litre contains 0.1 g. of the dyestuff III, 0.2 g. of sodium acetate, 3 g. of sodium sulfate, 0.25 g. of glacial acetic acid, 0.15 g. of the addition product of 1 mol of oleyl alcohol and 50 mols of ethylene oxide and 0.33 g. of the compound

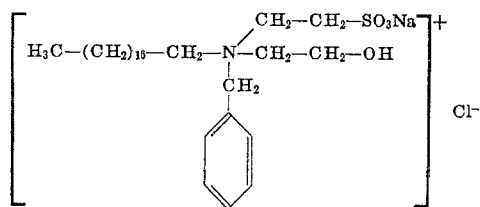

The bath is very gradually heated to 98° C. and is kept at this temperature for 60 minutes. A knitted fabric of unchanged full woolly handle, dyed with excellent uniformity in a lively blue shade, is obtained. Constitution of the dyestuffs designated by numbers I–V in the examples.

I 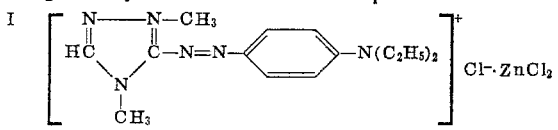

II 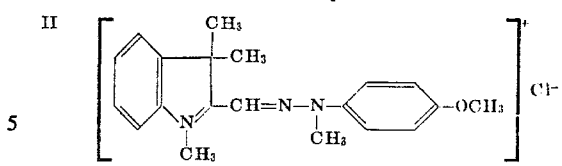

III C.I. 5,005

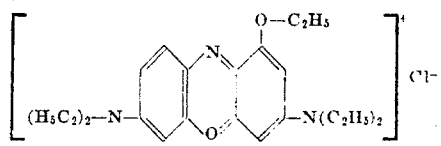

IV 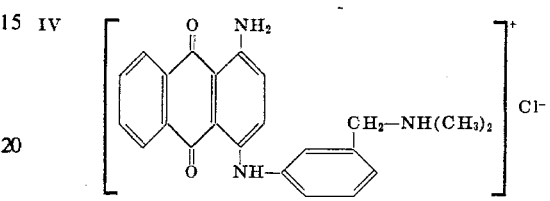

V 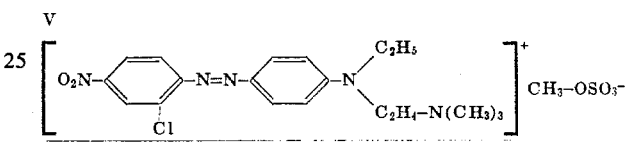

We claim:
1. Process for dyeing a polyacrylonitrile fiber comprising applying to said fiber a cationic dyestuff and an N-alkylaminoalkanesulfonic acid of the formula

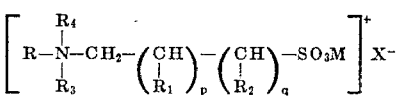

wherein $R_1$ and $R_2$ are hydrogen or a hydroxyl group, the sum p+q is a number from 1–3, M denotes hydrogen, an alkali or alkaline earth metal ion or an ammonium group, R represents an alkyl group of 10–22 carbon atoms, or an alkenyl radical of 10–22 carbon atoms, $R_3$ and $R_4$ represent an alkyl group of 1–8 carbon atoms, a hydroxyalkyl group of 1–8 carbon atoms, a carbonamido alkyl group of 1–8 carbon atoms or a benzyl group, and $x$ denotes an anion.

3. In the process of claim 3 wherein the cationic dye solution contains an N-alkylaminoalkanesulphonic acid of the formula of claim 5 which is an N-alkylaminoethanesulphonic acid.

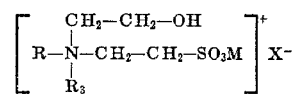

3. In the process of claim wherein the cationic dye solution contains an N-alkylaminoalkanesulphonic acid of the formula of claim 1 which is an N-hydroxethylaminoethanesulphonic acid.

UNITED STATES PATENT OFFICE
CERTIFICATE OF CORRECTION

Patent No. 3,619,121    Dated November 9, 1971

Inventor(s) Gunther Boehmke, Walter Hees

It is certified that error appears in the above-identified patent and that said Letters Patent are hereby corrected as shown below:

| COLUMN | LINE | ERROR |
|---|---|---|
| 1 | 20 | "$X^1$" should be ---$X^-$--- |
| 1 | 38 | "$X^1$" should be ---$X^-$--- |
| 2 | 75 | "C." should be ---goods--- |
| 3 | 11 | "bluishtinged" should be ---bluish-tinged--- |
| 3 | 32 | "dyes" should be ---dyed--- |
| 4 | 48 | Claim numbered "3." should be Claim numbered ---2.--- |
| 4 | 48 | "3 wherein" should be ---1 wherein--- |
| 4 | 50 | "5" should be ---1--- |
| 4 | 59 | after "claim" ---1--- should be inserted |

On the title page, column 2, line 9, "Szota" should be ---Szita---.

Signed and sealed this 9th day of May 1972.

(SEAL)
Attest:

EDWARD M. FLETCHER, JR.
Attesting Officer

ROBERT GOTTSCHALK
Commissioner of Patents